United States Patent Office 2,949,810
Patented Aug. 23, 1960

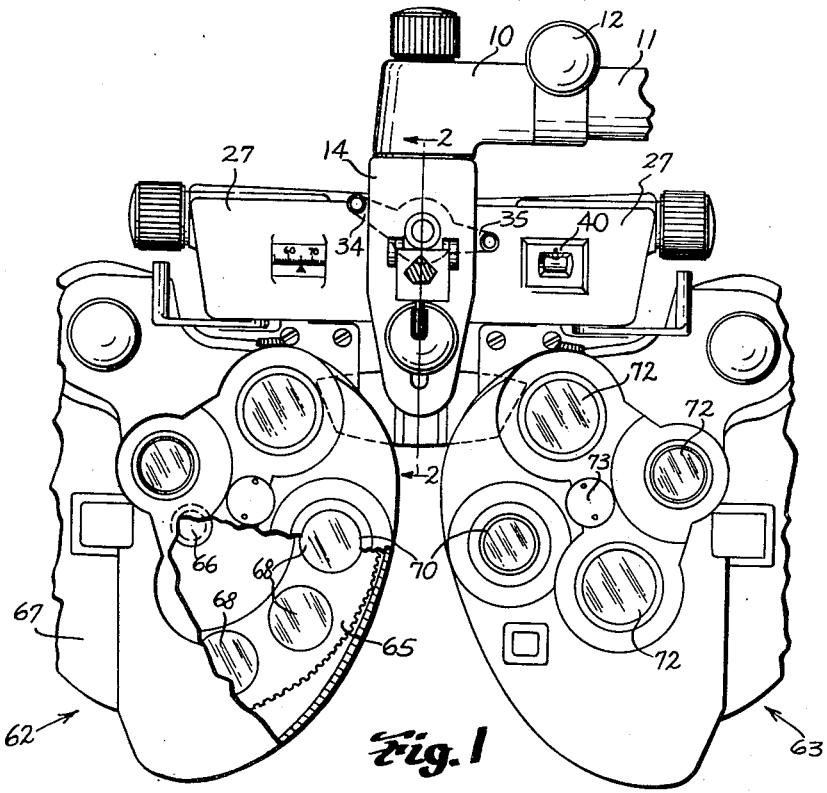
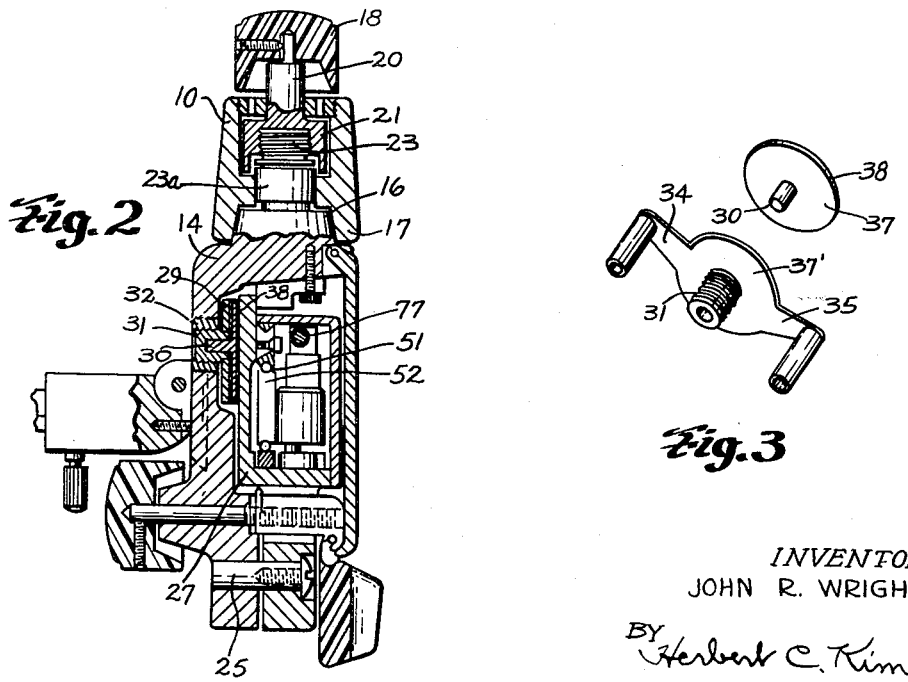

2,949,810

EYE TESTING INSTRUMENTS

John R. Wright, Eggertsville, N.Y., assignor to American Optical Company, Southbridge, Mass., a voluntary association of Massachusetts Filed June 26, 1957, Ser. No. 668,095

4 Claims. (Cl. 88—22)

The present invention relates to the adjustment of ophthalmic instruments having batteries of lenses so mounted in graded series on rotatable carriers that the practitioner may select lenses or combinations of lenses for determining the refractive errors of a patient's eyes. The instrument as a whole must at times be adjusted into alignment with the patient's eyes. The present invention relates to improved clamping means for retaining the instrument at the desired angle to which it has been tilted in adjusting it before the face of the patient.

An instrument having the foregoing functions is shown in my application for improvements in eye testing instruments, Serial No. 574,774 filed March 29, 1956, of which the present application is a continuation in part. The present invention is disclosed but is not claimed therein.

An object of the present invention is to provide in the limited space available clamping means which will retain the instrument rigidly in adjusted position, and which nevertheless is readily applied by the practitioner without a wrench or other tedious manipulation.

In the drawings which illustrate my invention:

Fig. 1 is a front view in elevation of eye testing apparatus embodying my invention;

Fig. 2 is a central vertical section on the line 2—2 in Fig. 1;

Fig. 3 is an exploded view showing the relation between two parts of my improved clamping means.

As is customary, the coupling 10 of the instrument is hung from a support 11 such as the crossbar of a floor stand or of a chair in which the patient is seated, being held in adjusted position on the support 11 by a lock knob 12. The coupling 10 adjustably carries a bracket 14 pivotally supporting the mechanism which adjusts the positioning of the two testing units to the eyes of the patient. As is shown in Fig. 2, the bracket is provided with a central collar 16 which is surrounded by a depending outwardly tapering flange 17 of the coupling 10. Above the coupling is a knob 18, secured to an extension 20 of a nut 21 which is threaded on a head 23 which projects upwardly from the bracket 14. The lower portion 23a of the head is nicely journaled in the coupling 10, so that a smooth pivoting of the bracket takes place relative to coupling 10 unless locked thereto by engagement of the tapering flange 17 with collar 16. Such locking is brought about by rotation of the knob 18, which by virtue of the threaded engagement of the nut 21 with the head 23, elevates the bracket to wedge the collar 16 within the flange 17.

The bracket 14 mounts at its lower end a pivot pin 25. A transverse track 27 carries a pair of slides (more fully described in my above identified application 574,774) of which one is shown herein at 52. The track 27 is adapted to tilt about the pivot pin 25 if released by the clamping means to which the present application is directed. Ball bearings 51 permit the slides to be shifted by the screw 77 to change the separation between the testing units 62 and 63 which are suspended below the respective slides. By tilting the track 27, the sight openings 70 of the testing units may be aligned with the respective eyes of the patient.

These testing units 62 and 63 are shown somewhat diagrammatically herein, as the details of their construction form no part of the present invention. In general, as is well known, each testing unit places before its respective eye of the patient a selected test element. For this purpose one or more carriers are rotatably mounted in or on each testing unit on such an axis or axes as to place the selected test element on the visual axis of the respective eye. In Fig. 1 such a carrier is shown at 65 which is mounted in the housing 67 of the testing unit to rotate about the axis 66. A plurality of lens elements 68 for eye testing purposes are mounted in the carrier 65, which may be rotated to bring any selected test element into registry with the sight opening 70 of the testing unit. In similar fashion, a battery of test elements 72 are carried by a rotatable turret 73 mounted on the testing unit 62 or 63 so that a selected test element 72 may be brought into registry with the sight opening 70. One arrangement for mounting and rotating the carriers of the test lenses in the testing units is described and claimed in the copending application of John R. Wright and George F. Schenk, Serial Number 629,059 filed December 18, 1956.

As shown in Fig. 2, the clamping means 29 include a stud 30 which extends into a screw press 31. The press 31 which acts to apply the clamping means is threaded within a sleeve 32 adjustably mounted within the bracket 14. The screw press 31 carries arms 34 and 35 by which it can be readily rotated to apply or release the clamping means 29 to the opposed surface of the track 27. As is apparent from Fig. 1, the lever arms 34 and 35 are conveniently arranged so that the practitioner may rotate the press 31 within its sleeve 32 to bring about bodily movement of the press 31 toward or away from the track 27, thereby applying or withdrawing the clamping means 29.

Turning the arms (and thereby the press) in one direction releases the clamping means. At this time the track 27 may be adjusted about the pivot 25, and to retain the track in adjusted position it is merely necessary to turn the press (by means of a lever arm) in the opposite direction. Better friction is obtained if the stud 30 is formed with an enlarged head, such as the disc 37 shown in the drawings. To still further improve the friction, a brake lining material 38 such as ground cork, may be affixed to the disc 37. The arms 34 and 35 merge into a back-up member 37' which is formed as a head or circular flange on the screw press 31. This member 37' is rotatable relative to the disc 37 so that when the arms 34, 35 together with back-up member 37' are turned to apply or release the clamping means, such turning need not overcome the friction of the brake lining 38 pressed against the track 27. Moreover, the rotatability of the disc 37 tends to avoid dislocating the carefully adjusted position of track 27 by the act of applying or releasing the clamping means.

It should be noted that the sleeve 32 may be threaded in the bracket 14. This is desirable so as to adjust the angle of turning of arms 34, 35 at which the clamping means release; because the arcuate movement of these arms is necessarily limited, and a faulty application of the clamping means may result through failure to press hard enough against the track 27. Accordingly, the adjustment of the sleeve 32 is available to take up any excess of play when the clamping means are released, or to allow more play if the clamping means do not release sufficiently. However, there should be sufficient friction in the threads connecting the sleeve 32 to the bracket 14 so that the sleeve does not turn when the press 31 is turned to apply the clamping means. Such friction may be effected by introducing a pellet of nylon in the recess in bracket 14 ahead of the sleeve 32 so as to be dispersed in the threads connecting the sleeve and the bracket. In this way the sleeve remains stationary except when it is purposely adjusted.

Comparing Figures 1 and 2, it will be noted that minimum space is occupied by my improved clamping means, and yet the lever arm 34 or 35, whichever is the handier, can be easily turned by the practitioner while he watches the bubble in the spirit level 40, or while he aligns the sight openings 70 with the two eyes of the patient. In fact the threads on the screw press 31 should be relatively coarse for rapid application of the friction disc 37, 38, because only a limited swing of the lever arms is available. Such rapid application is advantageous, so that the practitioner may rapidly make the required adjustment about the pivot pin 25. Accordingly, I have provided for very convenient and rapid adjustment by my improved clamping means.

I claim:

1. In eye testing apparatus having two testing units each for placing a selected test element before the respective eye of a patient and common mounting means for the two testing units having a transverse track, a bracket depending closely adjacent said transverse track and having a pivot pin disposed in its lower portion on an axis normal to said transverse track for pivotally supporting said track so as to tilt said track and vary the elevation of one of said testing units relative to the other, a clamp confined in the space between said bracket and said track and engageable with said track for retaining the transverse track in adjusted angular relation to its supporting bracket comprising an internally threaded sleeve carried by the bracket, a screw press threaded in said sleeve, said screw press having its head formed as a friction disc for engaging said transverse track and a lever arm on said screw press for rotating said press and forcing said friction disc against said transverse track, said arm extending from the space in which said clamp is confined to permit operation of said screw press.

2. In eye testing apparatus having two testing units each for placing a selected test element before the respective eye of a patient and common mounting means for the two testing units having a transverse track with the testing units movable along the track to accommodate the spacing of the units to the interpupillary distance of the patient's eyes, a bracket depending closely adjacent said transverse track and supporting said track on a pivot disposed beneath the track on an axis normal to said transverse track for pivotally supporting said track so as to tilt said track and vary the elevation of one of said testing units relative to the other, a clamp confined in the space between said bracket and said track and engageable with said track, said clamp comprising a friction disc mounted on a screw press and adapted to be pressed by the screw press into braking engagement with said transverse track, a sleeve carried by said bracket and having internal threads receiving said screw press and a lever arm carried by said screw press and projecting from between said track and its supporting bracket for effecting relative rotation between said screw press and said sleeve to press said friction disc into braking engagement with said track to retain said track in adjusted angular relation to its supporting bracket.

3. In eye testing apparatus, the structure as claimed in claim 2 in which the sleeve is threaded in the bracket to permit adjustment of the sleeve toward and away from the track.

4. In eye testing apparatus having two testing units each for placing a selected test element before the respective eye of a patient and common mounting means for the two testing units having a transverse track with the testing units movable in opposite directions along the track to accommodate the spacing of the units to the interpupillary distance of the patient's eyes, a bracket closely adjacent said track for supporting said transverse track on a pivot disposed beneath the track on an axis normal to said transverse track and a clamp confined in the space between said bracket and said track and interposed between said track and said bracket for preventing pivotal movement therebetween, said clamp comprising a friction disc mounted on a screw press for forcing the disc into braking engagement with said pivotally mounted track, an internally threaded sleeve cooperating with said screw press, said sleeve being carried by said bracket, and a lever arm for turning said screw press projecting from between said track and its supporting bracket.

References Cited in the file of this patent

UNITED STATES PATENTS

| | | |
|---|---|---|
| 1,432,821 | Woolf | Oct. 24, 1922 |
| 1,638,939 | Koenigkramer | Aug. 16, 1927 |
| 1,738,986 | Clement | Dec. 10, 1929 |
| 1,917,500 | Cook | July 11, 1933 |
| 2,256,491 | Peck et al. | Sept. 23, 1941 |
| 2,322,878 | Peck et al. | June 29, 1943 |

FOREIGN PATENTS

| | | |
|---|---|---|
| 473,719 | France | Oct. 10, 1914 |